(12) United States Patent
Fujii et al.

(10) Patent No.: US 7,854,772 B2
(45) Date of Patent: Dec. 21, 2010

(54) SOLID ELECTROLYTIC CAPACITOR AND MANUFACTURING METHOD THEREFOR

(75) Inventors: Eizo Fujii, Osaka (JP); Hidenori Kamigawa, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 408 days.

(21) Appl. No.: 12/105,059

(22) Filed: Apr. 17, 2008

(65) Prior Publication Data

US 2008/0222863 A1 Sep. 18, 2008

Related U.S. Application Data

(62) Division of application No. 11/590,001, filed on Oct. 31, 2006, now Pat. No. 7,375,950.

(30) Foreign Application Priority Data

Nov. 1, 2005 (JP) ............................... 2005-318891

(51) Int. Cl.
*H01G 9/00* (2006.01)
(52) U.S. Cl. ..................................... 29/25.03
(58) Field of Classification Search ................. 29/25.03
See application file for complete search history.

(56) References Cited

U.S. PATENT DOCUMENTS

| 6,903,921 | B2 | 6/2005 | Ishijima |
| 6,975,503 | B2 | 12/2005 | Abe et al. |
| 7,113,391 | B2 | 9/2006 | Ishida et al. |
| 7,133,276 | B2 | 11/2006 | Fujii et al. |
| 2006/0221556 | A1 | 10/2006 | Naito |

FOREIGN PATENT DOCUMENTS

| JP | 6-106288 A | 4/1994 |
| JP | 7-38031 A | 2/1995 |
| JP | 2002-175953 A | 6/2002 |
| JP | 2004-228424 A | 8/2004 |
| JP | 2004-349270 A | 12/2004 |
| JP | 2004349270 A | 12/2004 |
| JP | 2005101562 A | 4/2005 |
| JP | 2005-244177 A | 9/2005 |

OTHER PUBLICATIONS

Japanese Office Action dated Sep. 16, 2010, issued in Japanese Patent Application No. 2005-318891.

*Primary Examiner*—Alexander G Ghyka
*Assistant Examiner*—Seahvosh J Nikmanesh
(74) *Attorney, Agent, or Firm*—Westerman, Hattori, Daniels & Adrian, LLP

(57) ABSTRACT

A solid electrolytic capacitor of the present invention includes a capacitor element having an anode member, a dielectric member, and a cathode member; an anode terminal attached to the anode member; a cathode terminal attached to the cathode member; and a housing for covering an outer periphery of the capacitor element, the anode terminal and the cathode terminal being each at least partly exposed from an undersurface of the solid electrolytic capacitor, the anode terminal having a projection formed by rolling using a roll having a large diameter portion and a small diameter portion, and being connected to the anode member at the projection.

8 Claims, 5 Drawing Sheets

SOLID ELECTROLYTIC CAPACITOR AND MANUFACTURING METHOD THEREFOR

This application is a divisional of application Ser. No. 11/590,001, filed Oct. 31, 2006.

FIELD OF THE INVENTION

The present invention relates to a solid electrolytic capacitor, and a manufacturing method therefor, which has an anode terminal or a cathode terminal exposed to an undersurface thereof.

BACKGROUND OF THE INVENTION

A solid electrolytic capacitor structured as shown in FIG. 9 has been conventionally known. This solid electrolytic capacitor includes a capacitor element 2 having an anode terminal 10' and a cathode terminal 12' attached to an undersurface thereof. The capacitor element 2 is covered with a housing 8 made of a synthetic resin. The capacitor element 2 includes a dielectric oxide film 5, a cathode layer 6, and a cathode lead layer 7, which are sequentially formed on a peripheral surface of an anode element 3, which is a sintered body of a valve metal. A valve metal means here a metal for forming an extremely fine and durable dielectric oxide film 5 by electrolytic oxidation treatment, and may be tantalum, niobium, aluminum, titanium, etc.

An anode lead 4 made of tantalum projects from the heightwise middle of the anode element 3. Because the anode lead 4 and the anode terminal 10' have a different height, a cylindrical bolster member 9 intervenes between the anode lead 4 and the anode terminal 10' to electrically connect the both (see, for example, JP 2005-244177, A).

The arrangement of the bolster member 9 being attached on the anode terminal 4 as described above however complicates the attachment process, and requires high accuracy in attachment, because the bolster member 9 has a small diameter and length of 1 mm or less. In order to avoid the process that is complicated and needs high accuracy, it is possible to etch a metal plate to form a projection. However, low etching accuracy in mass production could cause projections with great variations in height. This makes it difficult to attach the anode lead, entailing problems of poor appearance and performance variations.

SUMMARY OF THE INVENTION

In view of the above problems, the present invention aims to provide solid electrolytic capacitors, and a manufacturing method therefor, which have anode terminals or cathode terminals with few variations in dimension, as well as projections etc. that can be easily formed.

A solid electrolytic capacitor of the present invention includes a capacitor element having an anode member, a dielectric member, and a cathode member; an anode terminal attached to the anode member; a cathode terminal attached to the cathode member; and a housing for covering the capacitor element, the anode terminal and the cathode terminal each having an exposed surface exposed from an undersurface of the housing, the anode terminal having a projection formed by rolling using a roll having a large diameter portion and a small diameter portion, and being connected to the anode member at the projection.

Another solid electrolytic capacitor of the present invention includes a capacitor element having an anode member, a dielectric member, and a cathode member; an anode terminal attached to the anode member; a cathode terminal attached to the cathode member; and a housing for covering the capacitor element, the anode terminal and the cathode terminal each having an exposed surface exposed from an undersurface of the housing, the cathode terminal having a recess formed on the exposed surface by rolling using a roll having a large diameter portion and a small diameter portion, the recess being filled with a synthetic resin included in the housing, the synthetic resin dividing the exposed surface into a plurality of areas.

A solid electrolytic capacitor manufacturing method of the present invention includes the steps of:

producing a capacitor element having an anode member, a dielectric member, and a cathode member;

producing an anode terminal and a cathode terminal from a metal plate before or after the step of producing the capacitor element;

placing the capacitor element on the anode terminal and the cathode terminal, connecting the anode member and a projection of the anode terminal, and connecting the cathode member and the cathode terminal; and coating the capacitor element on the anode terminal and the cathode terminal with a housing, wherein the projection of the anode terminal is formed at the step of producing the anode terminal and the cathode terminal by rolling the metal plate using a roll having a large diameter portion and a small diameter portion, and the anode terminal and the cathode terminal are each at least partly exposed from an undersurface of the housing at the step of coating the capacitor element with the housing.

Another solid electrolytic capacitor manufacturing method of the present invention includes the steps of:

producing a capacitor element having an anode member, a dielectric member, and a cathode member;

producing an anode terminal and a cathode terminal from a metal plate before or after the step of producing the capacitor element;

placing the capacitor element on the anode terminal and the cathode terminal, connecting the anode member and the anode terminal, and connecting the cathode member and the cathode terminal; and coating the capacitor element on the anode terminal and the cathode terminal with a synthetic resin to form a housing, wherein a recess is formed on an undersurface of the cathode terminal at the step of producing the anode terminal and the cathode terminal by rolling the metal plate using a roll having a large diameter portion and a small diameter portion, and the anode terminal and the cathode terminal are each at least partly exposed from an undersurface of the housing at the step of forming the housing, with the recess of the cathode terminal being filled with the synthetic resin, whereby the exposed surface of the cathode terminal is divided into a plurality of areas.

The above solid electrolytic capacitor and manufacturing method therefor of the present invention enable the projection of the anode terminal for connecting the anode member of the capacitor element to be formed with ease and high accuracy, thereby improving productivity. In addition, the exposed surface of the cathode terminal on the undersurface of the capacitor element can be easily divided.

DETAILED DESCRIPTION OF THE EMBODIMENT

Figure 7:
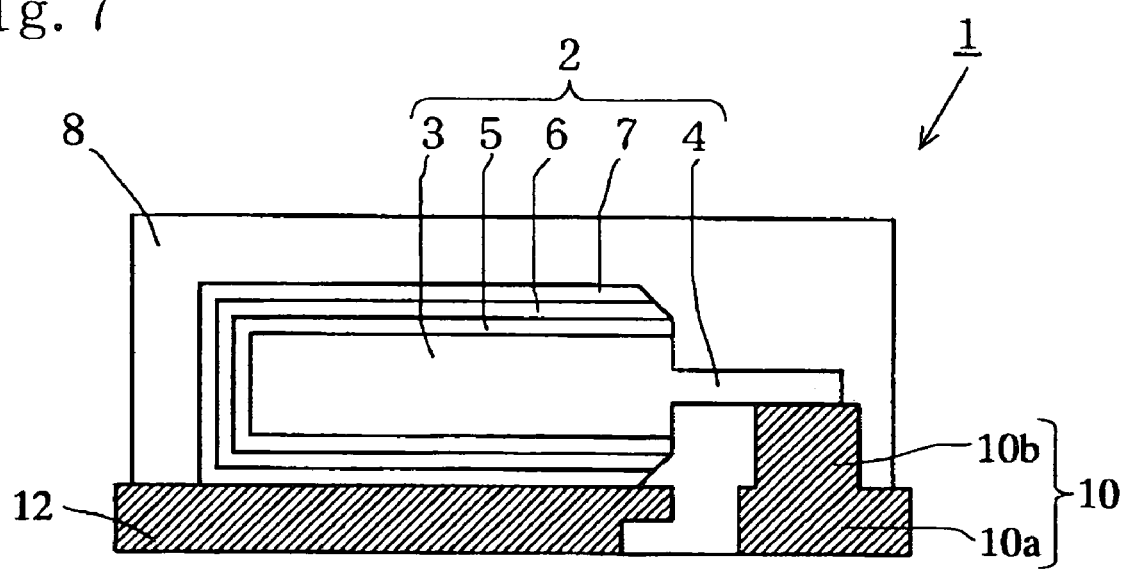
FIG. 7 is a longitudinal sectional view of a solid electrolytic capacitor produced by the solid electrolytic capacitor manufacturing method.

As shown in FIG. 7, a solid electrolytic capacitor 1 manufactured by the present invention includes a capacitor element 2, an anode terminal 10 and a cathode terminal 12 connected to the capacitor element 2, and a housing 8 made of a synthetic resin for covering the capacitor element 2. The capacitor element 2 includes a dielectric oxide film 5, a cathode layer 6, and a cathode lead layer 7, which are sequentially formed on a peripheral surface of an anode element 3, which is a sintered body of a valve metal. The anode element 3 has an anode lead 4 made of tantalum and providing an anode member, which projects from the heightwise middle of the anode element 3.

Usable for the cathode layer 6 is a solid electrolyte made of a conductive inorganic material such as manganese dioxide, or a conductive organic material such as TCNQ complex salt and a conductive polymer. The cathode lead layer 7 may be, for example, sequentially formed carbon and silver layers, or a metal plating layer.

The anode element 3 may be in the form of a plate or foil other than a sintered body. If a plate or foil made of a metal such as aluminum is used as an anode element, for example, then a portion thereof where no cathode layer is formed functions as an anode member, whereas the anode element 3 shown in FIG. 7 has the anode lead 4 projected therefrom. The cathode layer 6 and the cathode lead layer 7 function as a cathode member, and the dielectric oxide film 5 as a dielectric member.

The anode terminal 10 is formed from a base 10a and a projection 10b. The anode lead 4 of the capacitor element 2 is placed on the projection 10b. The anode lead 4 is connected to the anode terminal 10 by resistance welding, laser welding, or the like. A base material to be used for the anode terminal 10 and the cathode terminal 12 may be the same material as conventionally used (an iron-nickel alloy, a copper alloy, etc.), but it is preferable from the viewpoint of workability and conductivity to use copper or an alloy mainly containing copper.

The capacitor element 2 is placed on the cathode terminal 12. The cathode lead layer 7, which is a part of the cathode member of the capacitor element 2, is connected to the cathode terminal 12 using a conductive adhesive such as a silver paste. The anode terminal 10 and the cathode terminal 12 have an undersurface thereof exposed from an undersurface of the housing 8.

Figure 1:
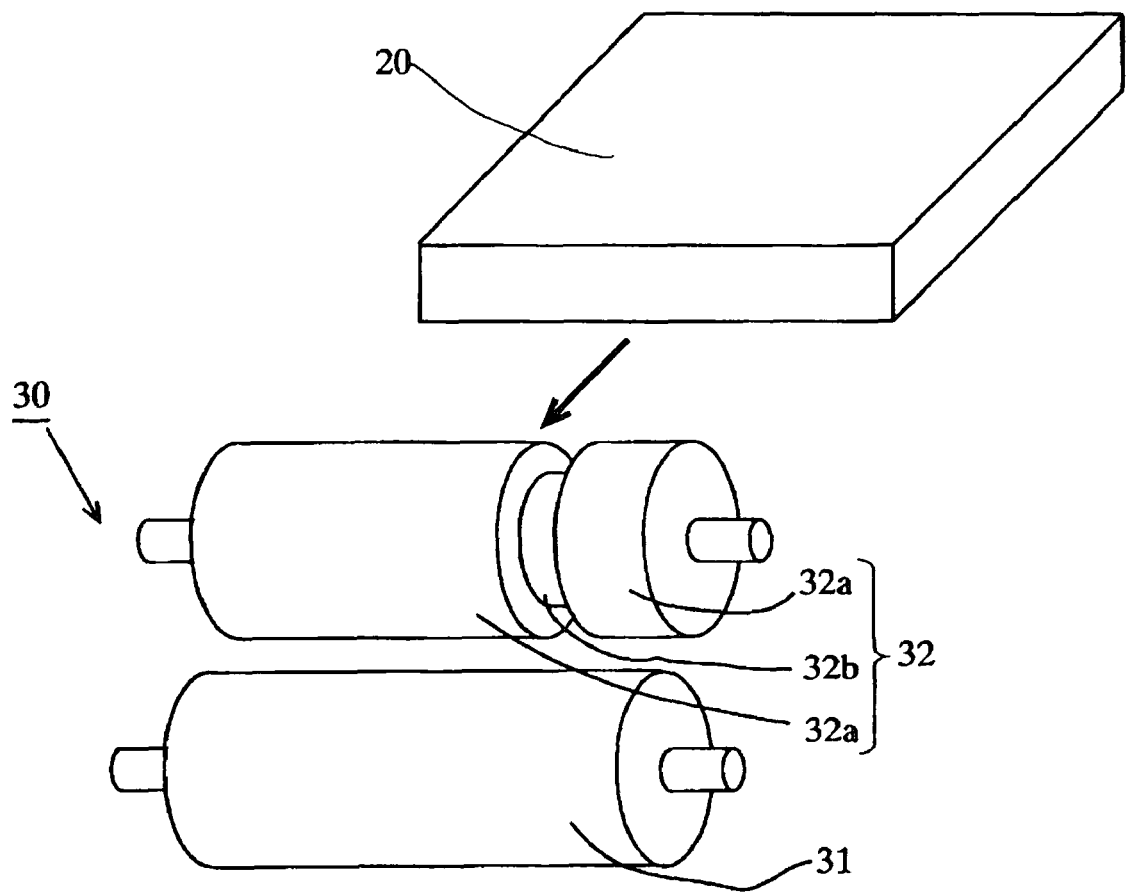
FIG. 1 is a perspective view showing a rolling step of a solid electrolytic capacitor manufacturing method of the present invention.
Figure 2:
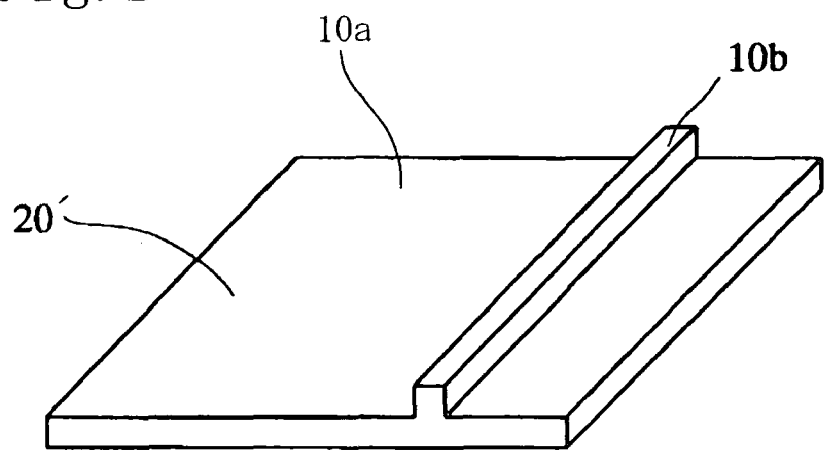
FIG. 2 is a perspective view of a metal plate rolled in the solid electrolytic capacitor manufacturing method.

Now, an example of a manufacturing method for the solid electrolytic capacitor of the present invention is described with reference to the drawings. First, a metal plate 20 made of a copper alloy is rolled using a rolling machine 30 shown in FIG. 1. The rolling machine 30 includes an upper roller 32 having a large diameter portion 32a and a small diameter portion 32b, and a cylindrical lower roller 31. The metal plate 20 is passed between the upper roller 32 and the lower roller 31 to thereby provide a metal plate 20', as shown in FIG. 2, formed with a projection 10b to be attached to the anode lead 4 and a tabular base 10a not to be in contact with the anode lead 4. The rolling is done such that the ratio of the thickness of the base 10a and the projection 10b in total to the thickness of the base 10a only is 2:1.

Figure 3:
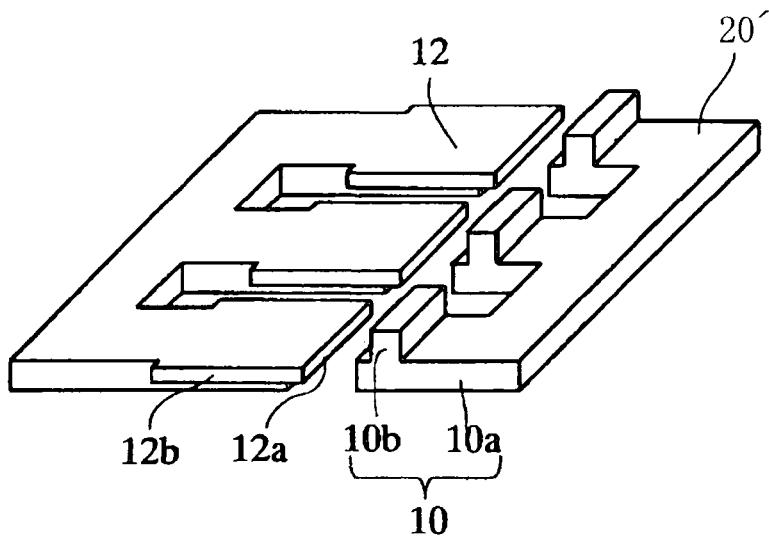
FIG. 3 is a perspective view showing an anode and cathode terminals producing step of the solid electrolytic capacitor manufacturing method.

Thereafter, as shown in FIG. 3, the metal plate 20' is cut along a line parallel with the projection 10b extending direction to separate anode terminals 10 and cathode terminals 12. At the same time, the metal plate 20' is blanked so as to define an outline of an anode terminal 10 and a cathode terminal 12 of each capacitor element. A forward projecting portion 12a projecting forward from the front end of the cathode terminal 12, which is closer to the anode terminal 10, toward the anode terminal 10 is formed above the level of the undersurface of the cathode terminal 12, while a sideward projecting portion 12b projecting sideward from the opposite sides of the cathode terminal 12 is formed above the level of the undersurface of the cathode terminal 12.

Figure 4:
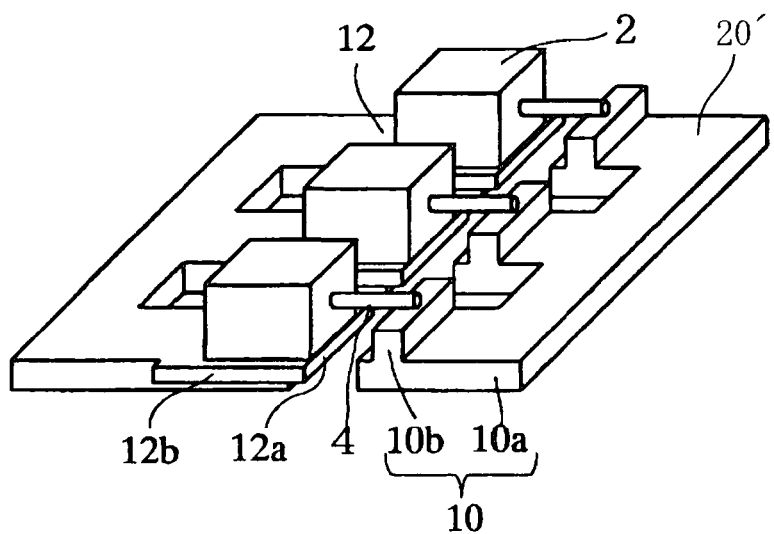
FIG. 4 is a perspective view showing a capacitor element placing step of the solid electrolytic capacitor manufacturing method.

Subsequently, as shown in FIG. 4, a plurality of capacitor elements 2 are placed on the metal plate 20', corresponding to respective anode terminals 10 and cathode terminals 12. Each of the capacitor elements 2 includes a dielectric oxide film, a cathode layer, which is a solid electrolyte layer including polypyrrole, and a cathode lead layer, which is carbon and silver layers, which are sequentially formed on a surface of an anode element made of a tantalum sintered body. A conductive adhesive including a silver adhesive is applied on the cathode terminal 12, on which the capacitor element 2 is placed to connect the cathode lead layer to the cathode terminal 12. The anode lead of the capacitor element 2 is placed on the projection 10b of the anode terminal 10 to connect the anode lead to the anode terminal 10 by resistance welding.

Figure 5:
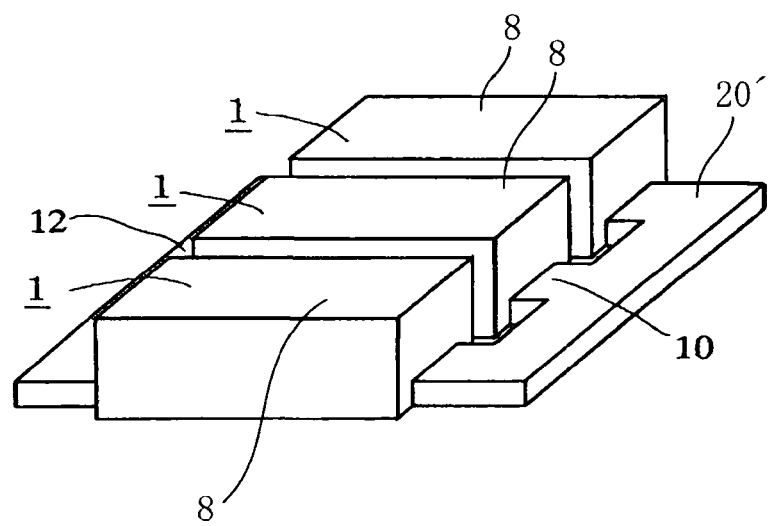
FIG. 5 is a perspective view showing a housing forming step of the solid electrolytic capacitor manufacturing method.
Figure 6:
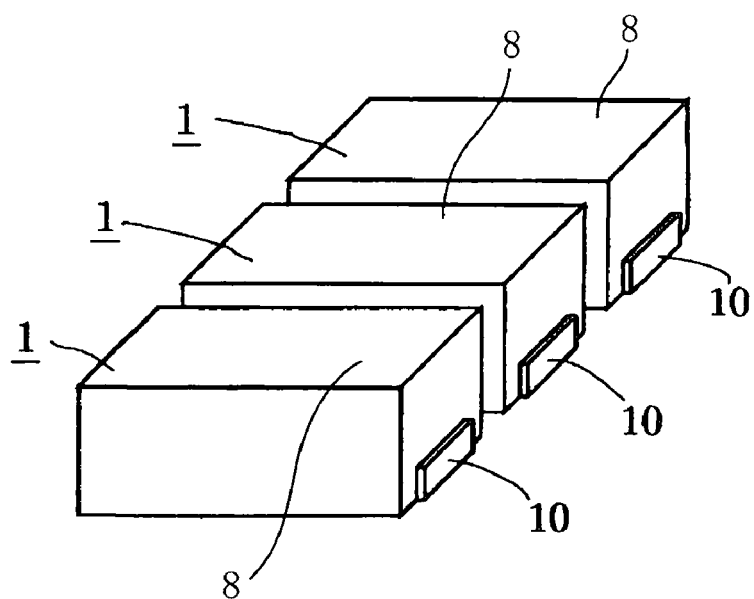
FIG. 6 is a perspective view showing a cutting step of the solid electrolytic capacitor manufacturing method.

Thereafter, each of the capacitor elements 2 is contained in a mold. A synthetic resin is injected into the mold to cover the outer periphery of the capacitor element 2 with a housing 8 as shown in FIG. 5. The undersurface of the anode terminal 10 and the cathode terminal 12 is exposed from the undersurface of the housing 8. The anode terminal 10 and the cathode terminal 12 also partly project from a lower portion of the opposite sides of the housing 8 in an arrangement direction of the anode terminal 10 and the cathode terminal 12 constituting each of the capacitor elements (see FIG. 7). Finally, the metal plate 20' is cut for each of the capacitor elements to provide a plurality of solid electrolytic capacitors 1 as shown in FIG. 6.

The solid electrolytic capacitor manufacturing method of the present invention would not need a step of attaching a bolster member to the anode terminal, as conventionally used, which requires high accuracy. In addition, according to the rolling step using the rolling machine 30 including the upper roller 32 and the lower roller 31 as shown in FIG. 1, it is possible to precisely define, with high accuracy, a dimension of the metal plate 20' after rolling shown in FIG. 2, that is, the thickness of the base 10a and the height of the projection 10b of the anode terminal 10 of the solid electrolytic capacitor shown in FIG. 7, from the diameter difference between the large diameter portion 32a and the small diameter portion 32b of the upper roller 32 and the distance between both rollers 32, 31. Therefore, the projections have smaller variations in height than those of projections formed on the anode terminal by etching or the like in the conventional manufacturing method. This provides excellent productivity.

Further, the productivity is superior to that of a method where the projection is formed on the anode terminal by forging, with no physical problem such as damaging the anode terminal. That is, rolling would not significantly change the physical density of the anode terminal because the metal atoms are slid and rolled, but forging would increase the physical load of the anode terminal and easily damage the anode terminal because the metal atoms are pushed into one another. Such a damage of the anode terminal would easily occur if the base material is forged to half of its thickness or less. Therefore, the anode terminal manufacturing method by rolling of the present invention is particularly effective for anode terminals with a thickness of the base being ½ of or less than the total thickness including the projection.

Figure 8A:
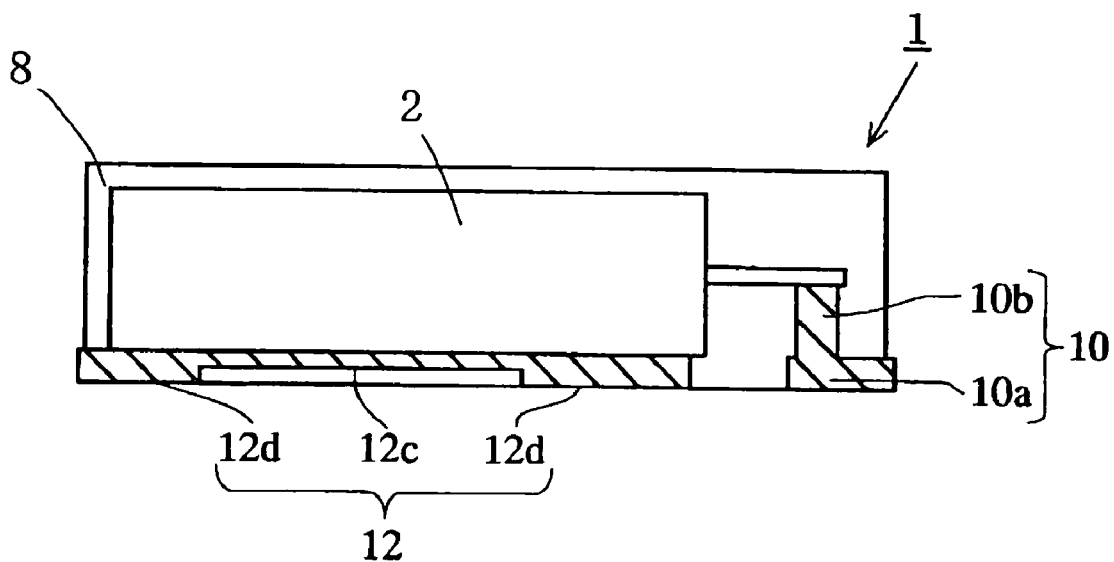
FIG. 8(A) and FIG. 8(B) are a sectional view and a back view, respectively, of a solid electrolytic capacitor produced in another embodiment.
Figure 8B:
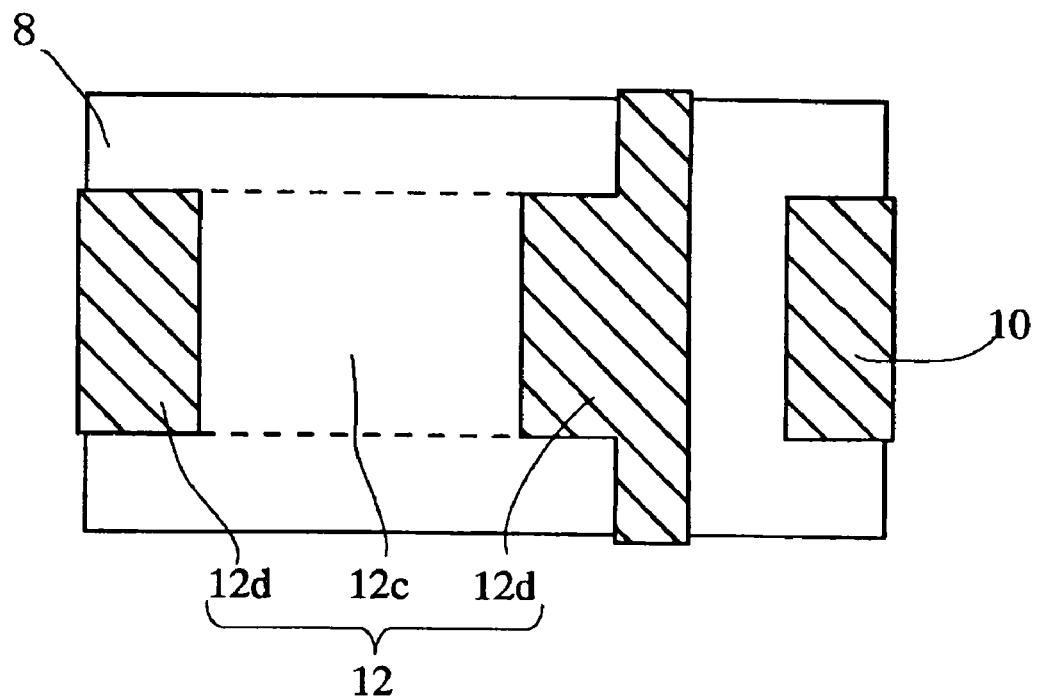
Figure 9:
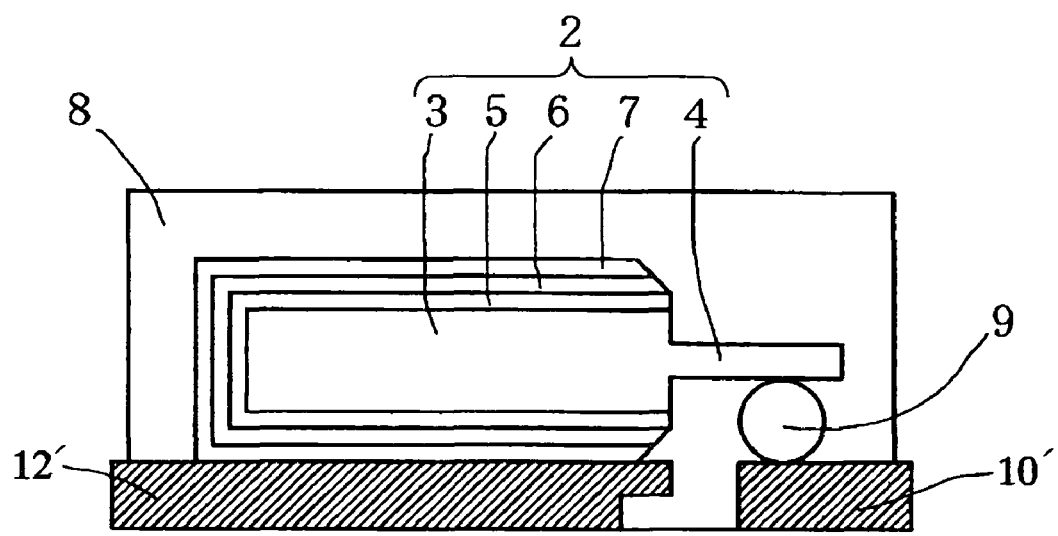
FIG. 9 is a longitudinal sectional view of a conventional solid electrolytic capacitor.

FIG. 8(A) and FIG. 8(B) show another embodiment of a solid electrolytic capacitor of the present invention. The embodiment has a plurality of cathode exposed portions 12d, 12d on the undersurface of the solid electrolytic capacitor 1, and forms a recess 12c between these cathode exposed portions 12d, 12d. The recess 12c is filled with a synthetic resin included in the housing 8. In manufacturing the solid electrolytic capacitor, the projection 10b of the anode terminal 10 and the recess 12c of the cathode terminal 12a can be formed at the same time by rolling a metal plate once. This can further improve the productivity.

The forward projecting portion 12a and sideward projecting portion 12b formed on the cathode terminal 12 in the above embodiment exert an effect of preventing the cathode terminal 12 from getting away from the housing 8 when subjected to an external force. Even if moisture can infiltrate from the interface between the housing 8 and the cathode terminal 12, the forward projecting portion 12a and the sideward projecting portion 12b will extend the infiltration route of water to the capacitor element, exerting an effect of maintaining electric characteristics of the solid electrolytic capacitor.

The above description of the embodiments is to describe the invention, and should not be understood to limit the invention as claimed, or to restrict the scope thereof. The present invention is not limited to the foregoing embodiments in construction but can of course be modified variously by one skilled in the art without departing from the spirit of the present invention as set forth in the appended claims.

What is claimed is:

1. A solid electrolytic capacitor manufacturing method comprising the steps of:
    producing a capacitor element having an anode member, a dielectric member, and a cathode member;
    producing an anode terminal and a cathode terminal from a metal plate before or after the step of producing the capacitor element;
    placing the capacitor element on the anode terminal and the cathode terminal, connecting the anode member and a projection of the anode terminal, and connecting the cathode member and the cathode terminal; and
    coating the capacitor element on the anode terminal and the cathode terminal with a housing,
    wherein the projection of the anode terminal is formed at the step of producing the anode terminal and the cathode terminal by rolling the metal plate, and the anode terminal and the cathode terminal are each at least partly exposed from an undersurface of the housing at the step of coating the capacitor element with the housing.

2. The solid electrolytic capacitor manufacturing method according to claim 1, wherein the projection of the anode terminal is formed by rolling the metal plate using a roll having a large diameter portion and a small diameter portion.

3. The solid electrolytic capacitor manufacturing method according to claim 1, wherein the anode terminal and the cathode terminal are produced at the same time from one metal plate.

4. The solid electrolytic capacitor manufacturing method according to claim 1, wherein the metal plate comprises copper or an alloy mainly containing copper.

5. The solid electrolytic capacitor manufacturing method according to claim 1, wherein the anode terminal has a tabular base and the projection projecting from an upper surface of the base, and the thickness of the base is smaller than a half of the thickness of the whole anode terminal including the projection.

6. A solid electrolytic capacitor manufacturing method comprising the steps of:
    producing a capacitor element having an anode member, a dielectric member, and a cathode member;
    producing an anode terminal and a cathode terminal from a metal plate before or after the step of producing the capacitor element;
    placing the capacitor element on the anode terminal and the cathode terminal, connecting the anode member and the anode terminal, and connecting the cathode member and the cathode terminal; and
    coating the capacitor element on the anode terminal and the cathode terminal with a synthetic resin to form a housing,
    wherein a recess is formed on an undersurface of the cathode terminal at the step of producing the anode terminal and the cathode terminal by rolling the metal plate, and the anode terminal and the cathode terminal are each at least partly exposed from an undersurface of the housing at the step of forming the housing, with the recess of the cathode terminal being filled with the synthetic resin, whereby the exposed surface of the cathode terminal is divided into a plurality of areas.

7. The solid electrolytic capacitor manufacturing method according to claim 6, wherein the recess of the cathode terminal is formed at the step of producing the anode terminal and the cathode terminal by rolling the metal plate using a roll having a large diameter portion and a small diameter portion.

8. The solid electrolytic capacitor manufacturing method according to claim 6, wherein the anode terminal and the cathode terminal are produced at the same time from one metal plate.

* * * * *